US012282444B2

(12) United States Patent
Benjamini et al.

(10) Patent No.: US 12,282,444 B2
(45) Date of Patent: Apr. 22, 2025

(54) CONNECTING NON-PCIe ACCELERATORS AS PCIe DEVICES

(71) Applicant: Google LLC, Mountain View, CA (US)

(72) Inventors: Yiftach Benjamini, Givat Elah (IL); Jonathan Charles Masters, Boston, MA (US); Henrietta Bezbroz, Or Akiva (IL)

(73) Assignee: Google LLC, Mountain View, CA (US)

( * ) Notice: Subject to any disclaimer, the term of this patent is extended or adjusted under 35 U.S.C. 154(b) by 68 days.

(21) Appl. No.: 17/987,497

(22) Filed: Nov. 15, 2022

(65) Prior Publication Data

US 2024/0160594 A1 May 16, 2024

(51) Int. Cl.
G06F 13/42 (2006.01)

(52) U.S. Cl.
CPC .. *G06F 13/4221* (2013.01); *G06F 2213/0026* (2013.01)

(58) Field of Classification Search
None
See application file for complete search history.

(56) References Cited

U.S. PATENT DOCUMENTS

| 7,032,052 | B2 | 4/2006 | Sauber et al. | |
| 10,698,854 | B1* | 6/2020 | Weishaupt | G06F 13/4068 |
| 11,106,616 | B1* | 8/2021 | Wu | G06F 13/4221 |
| 11,144,492 | B2 | 10/2021 | Das Sharma et al. | |
| 11,409,685 | B1* | 8/2022 | Kaplan | H04L 67/1095 |
| 11,561,894 | B2* | 1/2023 | Warkentin | G06F 13/1668 |
| 11,698,860 | B2* | 7/2023 | Raval | G06F 12/063 |
| | | | | 711/202 |
| 11,880,301 | B2* | 1/2024 | Warkentin | G06F 12/109 |
| 2011/0119423 | A1 | 5/2011 | Kishore et al. | |
| 2016/0274923 | A1* | 9/2016 | Harriman | G06F 13/4208 |
| 2018/0004566 | A1* | 1/2018 | Arroyo | G06F 9/45558 |
| 2019/0007310 | A1 | 1/2019 | Das Sharma et al. | |
| 2019/0018785 | A1* | 1/2019 | Beard | G06F 12/0653 |

(Continued)

FOREIGN PATENT DOCUMENTS

| EP | 3276899 A1 | 1/2018 |
| JP | 5374268 B2 | 12/2013 |
| JP | 6286551 B2 | 2/2018 |

OTHER PUBLICATIONS

Ahmed Bu-Khamsin, Socket Direct Protocol Over PCI Express Interconnect: Design, Implementation and Evaluation, Dec. 12, 2012, 62 pages.

(Continued)

*Primary Examiner* — Henry Tsai
*Assistant Examiner* — Christopher A Bartels
(74) *Attorney, Agent, or Firm* — Lerner David LLP

(57) ABSTRACT

Generally disclosed herein is an approach for enabling the connection of non-PCIe accelerators as PCIe devices using a Peripheral Component Interconnect Express (PCIe) abstraction layer ("PAL"). Once the operating system accesses and configures any on-SoC devices and accelerators using standard PCIe APIs, all PCIe configuration transactions may be routed to the PAL. The PAL's firmware may present the operating system with a virtual PCIe space that contains all available SoC PCIe and non-PCIe devices. The firmware of the PAL may translate PCIe configuration transactions into device-specific configuration transactions.

19 Claims, 9 Drawing Sheets

(56) References Cited

U.S. PATENT DOCUMENTS

| | | | |
|---|---|---|---|
| 2019/0095554 A1* | 3/2019 | Ooi | G06F 13/4282 |
| 2019/0114195 A1* | 4/2019 | Jani | G06F 15/17331 |
| 2020/0401440 A1* | 12/2020 | Sankaran | G06F 9/45504 |
| 2021/0192314 A1* | 6/2021 | Aarts | G06N 3/044 |
| 2022/0114105 A1* | 4/2022 | Gupta | G06F 12/0897 |
| 2022/0214968 A1* | 7/2022 | Warkentin | G06F 13/1668 |
| 2023/0122654 A1* | 4/2023 | Warkentin | G06F 12/109 |
| | | | 711/202 |
| 2023/0325335 A1* | 10/2023 | Das Sharma | G06F 13/1663 |
| | | | 711/147 |

OTHER PUBLICATIONS

Extended European Search Report for European Patent Application No. 23173761.0 dated Mar. 22, 2024. 8 pages.

\* cited by examiner

CONNECTING NON-PCIe ACCELERATORS AS PCIe DEVICES

BACKGROUND

Server-grade System-on-Chips (SoCs) typically feature high-performance PCI Express (PCIe) root complex implementations utilized to attach a variety of general-purpose peripherals or accelerators located off-chip and expose their functions to software. The benefits of using PCIe may include broad hardware compatibility, abilities to assemble a variety of different system configurations over time, and a fully standardized software enumeration mechanism. However, on-SoC or on-package devices and accelerators are typically exposed to the operating system as static Memory Mapped IO (MMIO) regions within the overall System Address Map (SAM).

The static address regions contain the Control and Status Registers (CSRs) for a specific IP block. The on-SoC IP blocks are not logically attached to an enumerable bus. Rather, their location in the SAM is hard-coded into various informational tables provided to the operating system. The operating system does not have any standardized means to discover and/or enumerate those devices other than using a firmware-maintained table. The operating system does not have any means to control or isolate those on-SoC IP blocks using a Memory Management Unit (MMU) from other system devices or assign them to a guest virtual machine. Device drivers are specific both to a given device and to the SoC that devices reside within.

BRIEF SUMMARY

Generally disclosed herein is an approach for enabling the connection of non-PCIe devices, such as accelerators, as abstracted PCIe devices using a PCIe abstraction layer ("PAL"). According to this approach, an operating system accesses and configures any on-SoC devices and accelerators using standard PCIe application programming interface (APIs). PCIe configuration transactions may be routed to the PAL. The PAL's firmware may present the operating system with a PCIe topology that contains all available SoC PCIe and abstracted PCIe devices. The firmware of the PAL may translate PCIe configuration transactions into device-specific configuration transactions, which are performed between the PAL and the non-PCIe device. Further, the firmware of the PAL may create a representation of configuration space enabling Single-root I/O Virtualization (SR-IOV) to allow for device virtualization even if such virtualization is not natively supported by the non-PCIe devices. Accordingly, a non-PCIe accelerator may be attached as an abstracted PCIe device without hardware changes and without changing an ordering model of the non-PCIe accelerator.

An aspect of the disclosure provides a method for connecting non-PCIe accelerators as PCIe devices. The method includes receiving, at a firmware-based PCIe abstraction layer ("PAL") for a system, configuration transactions from a core of the system, the configuration transactions for configuring a peripheral device being attached to the system. When the configuration transactions are for a non-PCIe device being attached to the system, the PAL terminates the configuration transactions for the non-PCIe device and configures the non-PCIe devices directly.

In an example, configuring the PCIe directly comprises processing device-specific and function-specific configurations directly with the non-PCIe device.

In yet another example, upon the configuring, the non-PCIe device accesses memory of the system directly using native interfaces and ordering schemes embedded in the non-PCIe device.

In yet another example, the method includes creating, with the one or more processors, a PCIe topology within the PAL, wherein the PCIe topology includes a plurality of PCIe devices and a plurality of abstracted PCIe devices.

In yet another example, the PCIe topology is accessed through an Enhanced Configuration Access Mechanism ("ECAM") to allow management of multiple PCIe configurations by stopping multiple threads from trying to simultaneously access a configuration space.

In yet another example, the method includes creating a PCIe configuration space when virtualization is not natively supported by the one of the plurality of the non-PCIe devices.

In yet another example, the method includes assigning the non-PCIe device to a memory mapped I/O ("MMIO") ranges and configuring a coherent mesh network to map the non-PCIe device to the PAL.

In yet another example, the non-PCIe device is an accelerator, and further comprising implementing an accelerator-specific interface that provides a virtual function separation.

In yet another example, when the configuration transactions are for a PCIe device, the configuration transactions to one or more controllers of the PCIe device are forwarded via a mesh network In yet another example, the method includes observing one or more configuration-write transactions to memory by maintaining a copy of a PCIe topology.

In yet another example, the method includes when the configuration transactions are for a PCIe device, forwarding, by the PAL, the configuration transactions to one or more controllers of the PCIe device.

In yet another example, the PCIe configuration space is created using a firmware of the PAL based on a representation of configuration space enabling single-root I/O virtualization (SR-IOV) to allow for device virtualization Another aspect of the disclosure provides a system including one or more memories; and one or more processors configured to: receive, at a firmware-based PCIe abstraction layer for a system, configuration transactions from a core of the system, the configuration transactions for configuring a peripheral device being attached to the system. When the configuration transactions are for a non-PCIe device being attached to the system as an abstracted PCIe device, the one or more processors are configured to terminate the configuration transactions for the non-PCIe device and configure the non-PCIe devices directly.

In an example, the one or more processors are configured to process device-specific and function-specific configurations directly with the non-PCIe device.

In yet another example, upon the configuring, the non-PCIe device accesses memory of the system directly using native interfaces and ordering schemes embedded in the non-PCIe device In yet another example, the one or more processors are configured to create a PCIe topology within the PAL, wherein the PCIe topology includes a plurality of PCIe devices and a plurality of abstracted PCIe devices.

In yet another example, the PCIe topology is accessed through an Enhanced Configuration Access Mechanism ("ECAM") to allow management of multiple PCIe configurations by stopping multiple threads from trying to simultaneously access a configuration space.

In yet another example, the one or more processors are configured to create a PCIe configuration space when virtualization is not natively supported by the one of the plurality of non-PCIe devices.

In yet another example, the one or more processors are configured to assign the non-PCIe device to a memory-mapped I/O ("MMIO") ranges and configure a mesh network to map the non-PCIe device to the PAL.

In yet another example, when the configuration transactions are for a PCIe device, the configuration transactions to one or more controllers of the PCIe device is forwarded via a mesh network.

DETAILED DESCRIPTION

Figure 1:
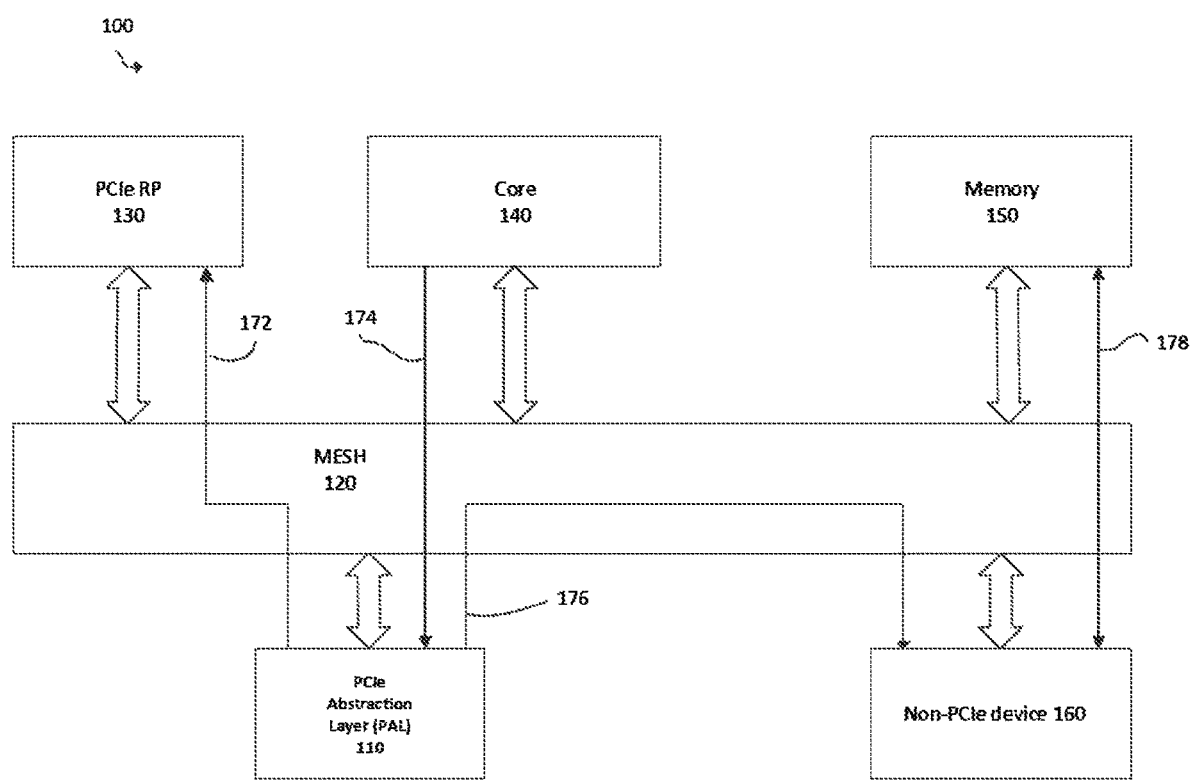
FIG. 1 depicts a block diagram of an example platform according to aspects of the disclosure.

Generally disclosed herein is an approach for enabling the connection of non-PCIe accelerators as PCIe devices. Peripheral devices may include both PCIe devices and non-PCIe devices. The PAL may be a system-on-chip (SoC) Microcontroller. The PAL may communicate with a core, memory, and accelerator through hardware interconnect on-chip, such as a mesh. PCIe configuration transactions are routed to the PAL from the core where PCIe driver software is running.

PAL may provide the PCIe driver software with an interface to an SoC PCIe topology, which may include a mix of PCIe devices and non-PCIe devices that are coupled to the mesh and accessed as "abstracted" PCIe devices. Examples of such abstracted PCIe devices are hardware accelerators, including but not limited to, direct memory access (DMA), encryption engines, compression engines, etc. Configuration transactions for PCIe functions are forwarded to respective controllers in the PCIe devices through the PCIe topology. PAL may terminate configuration transactions targeting abstracted PCIe devices.

The PAL may implement a virtual configuration space within its own memory space. It may then respond to any configuration reads or writes on behalf of any non-PCIe devices. The PAL may also generate non-PCIe configuration accesses to the non-PCIe devices based on an interpretation of the original PCIe configuration transaction. For example, the PCIe driver software may write to the Function Level Reset (FLR) register in a non-PCIe device's configuration space. The PAL may terminate the PCIe transaction and may generate a non-PCIe transaction towards the non-PCIe device which then may write the FLR register. Once configured by the PAL, the non-PCIe device can access the memory directly using its native interface and ordering scheme.

According to some examples, PAL creates a virtual configuration space for each non-PCIe device within the PAL memory. The virtual configuration space may be a representation of a standard PCIe configuration space in the PAL's local memory. The PAL may not necessarily implement all the defined PCIe configuration registers. The PAL may only implement the configuration registers for the ones most relevant to the non-PCIe devices. The firmware creates a PCIe topology that may contain all available SoC PCIe and non-PCIe-based devices. PAL firmware may present the created PCIe topology to the operating system. The PCIe driver software may use standard PCIe configuration transactions to enumerate non-PCIe devices and assign them to memory-mapped I/O (MMIO) ranges. The PAL may configure the SoC's internal interconnect (e.g. internal bus, mesh, NoC, etc.) so that all MMIO ranges initially allocated to non-PCIe devices are mapped to PAL itself. In the virtual PCIe space, PAL may allow and present a single virtual endpoint for each non-PCIe device. Each virtual endpoint may support as many PCIe functions as required by the non-PCIe device that is being abstracted by the PAL.

According to some examples, PAL may handle all the PCIe configuration transactions in the system. The PCIe driver software accesses PCIe configuration spaces through an Enhanced Configuration Access Mechanism (ECAM). The ECAM allows PCIe driver software to access the configuration space of all devices in the PCIe topology. The configuration space available per function is 4 KB and the ECAM may map all possible PCIe configuration addresses into a single memory range, such as 128 MB, 256 MB, 512 MB, or other size memory range. Addresses from the ECAM range are mapped to PCIe bus/device/function (BDF) identifiers, so that when software accesses an address range allocated to a specific function, the memory read or write transaction may be routed to the correct device. In this regard, PCIe root ports of PCIe devices may translate the transactions into a PCIe configuration Transaction Layer Protocol (TLP) and send the translated transactions to downstream PCIe devices.

According to some examples, PAL may configure accelerator Message Signaled Interrupt (MSI) definitions based on the configuration transactions generated by the driver software for non-PCIe devices that support MSI generation. The PCIe devices may assert interrupts towards the operating system by using MSI. As the on-SoC non-PCIe device may not support MSI generation, PAL may provide a service to translate line interrupts to MSIs. In some examples, PAL may implement a hardware unit to handle the translation for line interrupts to MSI to avoid having the microcontroller as part of the interrupt path. The PAL's firmware may configure a table based on PCIe configuration transactions targeting a virtual endpoint allocated to each non-PCIe device. Such a table may be used to generate {DeviceID, EventID} on an interface towards software that translated interrupt. Further interrupt processing, such as clearing status bits, may be performed between the non-PCIe device's driver and its hardware directly.

According to other examples, all PCIe or non-PCIe-based reset requests are translated by the PAL into a sequence of actions that may generate the requested reset effect in a specific device. Function level reset handling depends on non-PCIe device-specific implementation. Non-PCIe-level resets are driven by the Power Management support system. Inter-Process Communication (IPC) between the Power Management support system and PAL may be used to communicate reset instructions. A reset may take a PCIe device to a known preliminary state. A reset may be necessary when an error occurs. For example, if a non-PCIe device such as a DMA has 32 channels and each channel is connected to 32 individual virtual endpoints within the PAL, multiple channels may not need to be reset. The PAL may communicate reset instructions for a single channel through the specific virtual endpoint connected to that specific channel.

According to some examples, Single-root I/O Virtualization (SR-IOV) support relies on specific non-PCIe device implementation. The PAL may implement a virtual configuration space which may include virtual function capabilities assuming the non-PCIe device supports virtualization. The PAL firmware implements an accelerator-specific interface that can provide virtual function separation to ensure that different virtual functions do not impede one another. For example, PAL may dynamically allocate the amount of available DMA engines based on the number of configured virtual functions. If a single virtual function is configured, all available DMA channels may be allocated to that single virtual function. If another virtual function is configured, PAL may split the available DMA channels evenly between the two virtual functions.

According to some examples, PAL does not actively participate in Memory-mapped I/O (MMIO) allocation process for physical PCIe root ports and devices. Configuration transactions pass through PAL, and PAL routes them to the corresponding root ports, but PAL does not modify or observe the contents of these transactions. On the other hand, for abstracted PCIe devices, PAL provides the configuration space interface to PCIe software for the abstracted PCIe devices. For each accelerator, PAL shall provide a Base Address Register (BAR) size requirement based on the specific Accelerator's needs. PAL presents virtual function configuration spaces and BARs for accelerators supporting SR-IOV.

The PAL may be composed of a high-performance processor, wrapper, configuration interface, ingress queue handler, interrupt translation logic, internal data fabric, and address remap unit. The processor monitors enumerations by observing a configuration write (ConfigWr) transaction to Bus/Device/Function (BDF) based on maintaining the shadow PCIe topology. The PAL may then update the SoC's internal system address map based on PCIe MMIO allocation performed during the PCIe and non-PCIe devices' enumeration. The PAL may maintain a copy of the enumerated PCI topology within its memory to monitor which PCIe or non-PCIe devices reside under which port when the PAL needs to route configuration transactions to a specific root port or virtual root port.

According to some examples, the PAL may dynamically change an internal SoC configuration based on PCIe driver software's decisions during enumeration. Such a change may include OS boot. when the OS boots the system, the OS may configure a SoC's internal interconnect with the PAL PCIe's segment range. The OS may enumerate PCIe devices and allocate MMIO spaces in the OS PCIe segment range. When the data flow from the core to a root port of a PCIe device, access permission may be created for an MMIO translation targeting an MMIO space allocated to the root port in the OS PCIe address map. Then, the PAL's "address re-mapping function" may translate the addresses of the root port to PAL's segment addresses.

FIG. 1 depicts a block diagram of an example platform according to aspects of the disclosure. The PCIe abstraction platform 100 includes the PCIe Abstraction Layer (PAL) 110. PAL 110, for example, may be a microcontroller composed of a variety of components such as a processor, an internal configuration fabric, an ingress queue handler, an interrupt translation logic, an interrupt translation service and an address remapping unit. An example detailed architecture of PAL 110 is described in further detail below in connection with FIG. 4.

PAL 110 may receive all PCIe configuration transactions originating at the core 140. The core 140 may be a CPU core in communication with Memory 150.

The core 140 may be a microprocessor residing on a chip, a multi-core processor, or any other known processor. While only one CPU core is shown, any number of CPU cores may be connected. The core 140 may include a host or PCIe driver software that configures switch ports to route traffic based on the bus and device numbers.

The memory 150 may be any type of memory, such as read-only memory, random access memory, removable storage media, cache, registers, or the like.

The mesh 120 may be a hardware interconnect that connects PCIe devices, and non-PCIe devices with the core 140 and the memory 150. The mesh 120 may be any type of hardware interconnect on a chip. The mesh 120 may be configured dynamically based on PCIe's enumeration function.

The PCIe root port 130 may be a specific port on a computer's motherboard. The PCIe root port 130 may be a port on a root complex, or a portion of the motherboard that contains a host bridge. The host bridge may allow the PCI root ports to communicate with the rest of the computer, thereby enabling the components plugged into the PCIe root ports to work with the computer.

The non-PCIe device 160 may be any type of hardware device or software program with the main function of enhancing the overall performance of the computers. The non-PCIe device 160 may include a hardware accelerator, a graphics accelerator, a cryptographic accelerator, a web accelerator, a hypertext preprocessor accelerator, or the like.

In some examples, all PCIe configuration transactions may be routed to the PAL 110. Once the PAL 110 receives the PCIe configuration transaction information from core 140, the PAL 110 may generate an interface to an SoC PCIe topology and provide the host software embedded in core 140. The SoC PCIe topology may include a mixture of PCIe devices, such as a PCIe device connected through PCIe root port 130, and abstracted PCIe devices including the non-PCIe device 160. The configuration transaction directed to the PCIe devices may be forwarded to the PCIe root port 130 via the mesh 120. The configuration transactions directed to abstracted PCIe devices may be terminated by the PAL 110.

According to some examples, device or function-specific configurations may be handled directly by the firmware embedded in the PAL, as opposed to the non-PCIe device 160 accessing the memory 150 directly using its native interface and ordering scheme.

Figure 2:
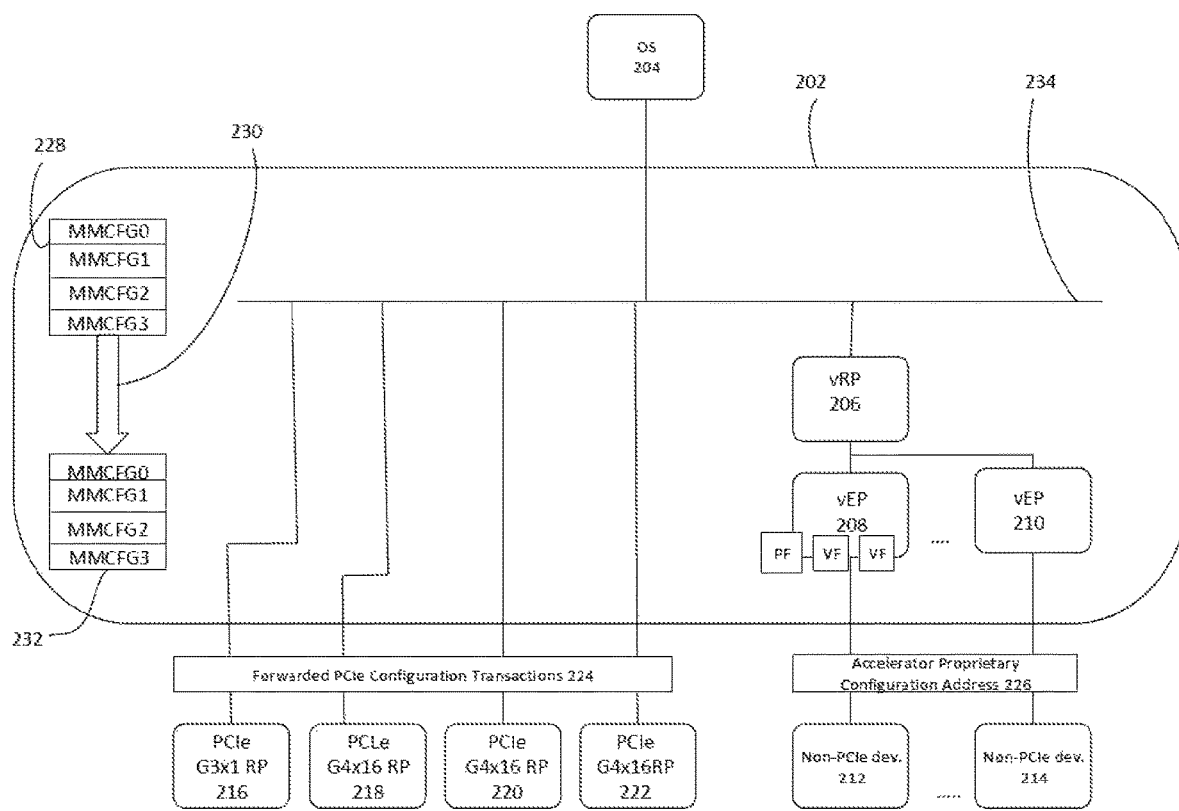
FIG. 2 depicts a block diagram of an example PCIe tree presented by PAL according to aspects of the disclosure.

FIG. 2 depicts a block diagram of an example virtual PCIe space presented by PAL according to aspects of the disclosure. According to some examples, the PAL 110 may allow the configuration and enumeration of non-PCIe on-SoC devices within the virtual PCIe space 202 by creating a virtual configuration space for each non-PCIe device within the PAL memory. The PCIe software of the core 140 may use standard PCIe configuration transactions to enumerate the accelerators and assign them MMIO ranges. The PAL 110 may configure the mesh 120 such that all MMIO ranges allocated to non-PCIe devices, including the non-PCIe device 160 by the PCIe software, may be mapped to the PAL 110.

In this example, the OS 204 may send the forwarded PCIe configuration transaction 224 through the bus 234 residing on the PAL 110 for each PCIe device 216, 218, 220, and 222. The original memory mapped configuration (MMCFG) address ranges 238 may go through the address translation process 230 by the PAL 110 such that the translated MMCFG address 232 is now stored within the memory of PAL 110 as statically configured address ranges.

PAL 110 may also present to a PCIe software within the core 140 a single virtual root port (vRP) 206. Under the vRP 206, the PAL 110 may present a single virtual endpoint (vEP) 208, vEP 210, or more virtual endpoints per non-PCIe device including the accelerator 160. Each virtual endpoint, in this example, vEP 208 and vEP 210, supports as many virtual functions as supported by one or more non-PCIe devices In some other examples, the PAL 110 may present Direct Memory Access (DMA) to the OS 204 as an SRIOV-capable non-PCIe device residing under the vRP 206. The DMA presented by the PAL 110 may support a number of channels, such as 64 channels or more. The PAL 110 may allow the DMA to support the virtualization of a number of virtual functions corresponding to the number of channels. Channels assignment may be static and managed by the PAL firmware. For example, the PAL 110 may allocate a single channel to a single virtual function. During the enumeration process for non-PCIe devices such as the non-PCIe device 160, the PAL 110 may request a MMIO range for each virtual function and for each physical function under each virtual endpoint.

Figure 3A:
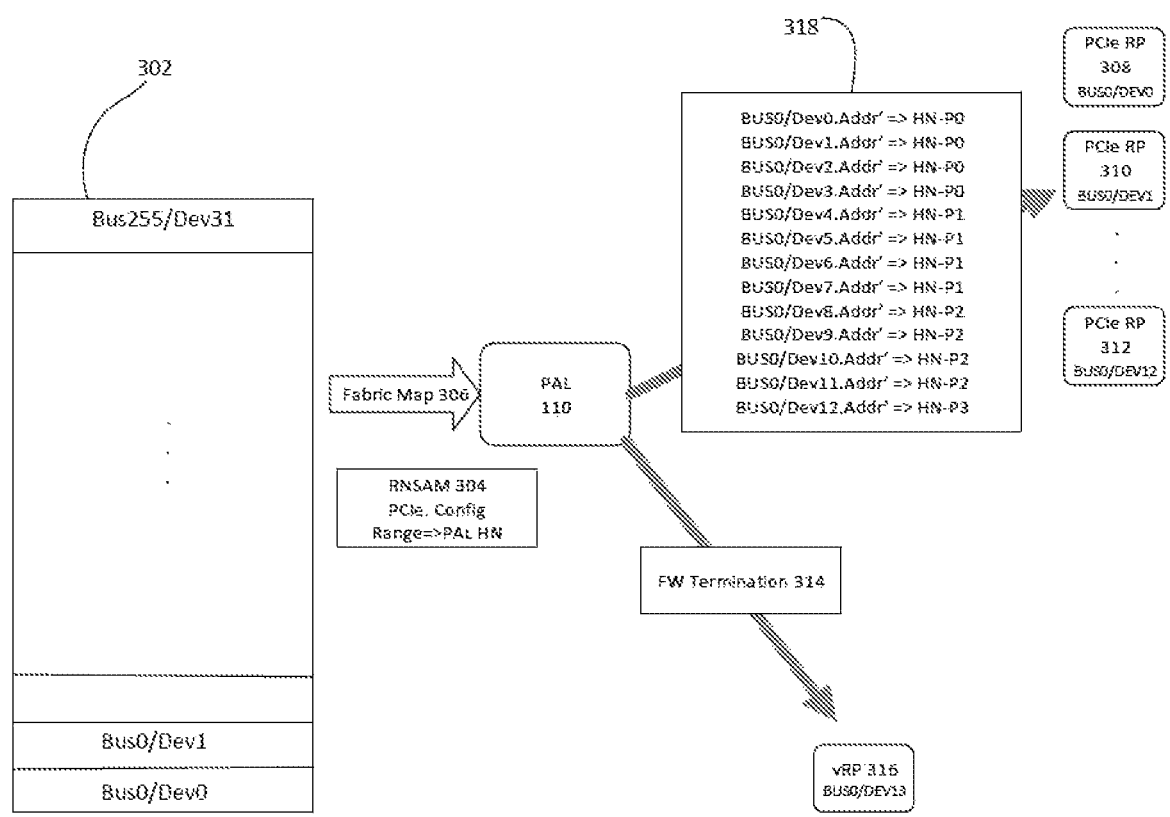
FIGS. 3A-3B depict block diagrams of example configuration space mapping according to aspects of the disclosure.
Figure 3B:
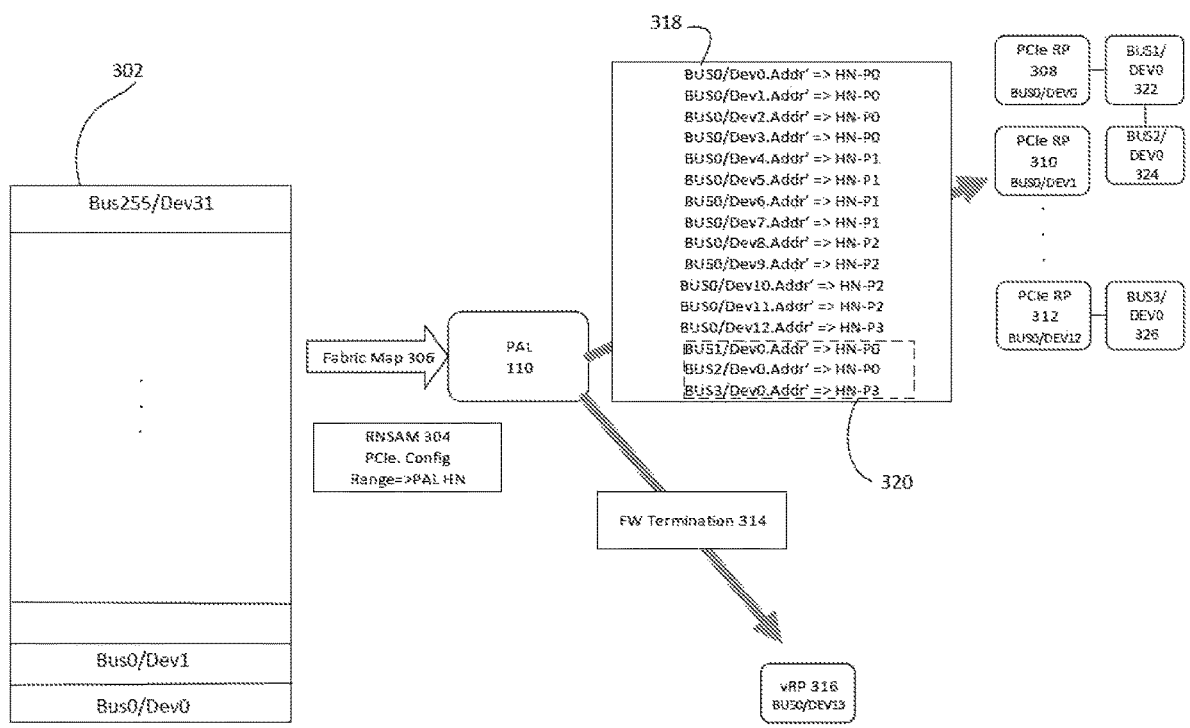

FIGS. 3A-3B depict block diagrams of example configuration space mapping according to aspects of the disclosure. In this example, the software running on core 140 may access the PCIe configuration space 202 via the Enhanced Configuration Access Mechanism (ECAM). ECAM is a mechanism allowing the PCIe to access a configuration space. ECAM may enable the management of multi-CPU configurations. Using the ECAM, the PCIe configuration space 202 may be mapped into memory addresses. ECAM may also allow a single command sequence. ECAM may map all possible PCIe configuration addresses into a single memory range.

Bus/Device/Function IDs are eight-bit PCI bus, five-bit device, and three-bit function numbers to identify a PCIe device. In some examples, the addresses from the ECAM range may be mapped to the PCIe Bus/Device/Function IDs. In this regard, when a PCIe driver software requests access to a range allocated to a specific function, such as for a memory read or write transaction, the core 140 may route the transaction command to the correct PCIe device. As the PAL 110 may handle all PCIe configuration transactions in the system, the ECAM range may be mapped directly to the PAL 110, so the above software access must reach the PAL 110 first. PAL 110 may remap the ECM address to a new range allocated to a specific PCIe device based on the pre-allocated mapping by the mesh 120 and the physical connection of the PCIe device in the system.

In some other examples, the PAL 110 may keep track of external PCIe Bus/Device/Function IDs, based on observations of the enumeration operation and keeping a copy of the PCIe configuration topology.

Referring to the example of FIG. 3A, a single segment in OS memory 302 may have a single 256 MB memory range. Each block of the single segment in OS memory 302 represents 4 KB of memory, and it may map the information corresponding to the combination of 32 devices, 256 buses, and 8 functions. The information stored in the single segment in OS memory 302 may go through the fabric map process 306 and reach the PAL 110. In this process, the address contained in Request Node System Address Map (RN-SAM) 304 containing the PCIe initial configuration range is sent directly to the PAL 110. The PAL 110 may perform a firmware termination process 314 when the PAL 110 determines that the Bus/Device/Function ID of a certain transaction matches a virtual root port or endpoint, for example, vRP 316. RN-SAM 318 may contain pre-configured ECAM addresses. RN-SAM 318 may also contain mapping information of each Bus/Device/Function ID for the corresponding PCIe device's root port, such as PCIe RP 308, 310, and 312.

Referring to FIG. 3B, the PAL 110 may monitor the enumeration of the configuration transactions and update the RN-SAM 304 as needed. Since PAL 110 is the only initiator of the ECAM targeted addresses, PAL 110 is allowed to update only its RN-SAM. In this example, new bus/device/function IDs 320 may be updated to the RN-SAM 304. The new bus/device/function IDs 320 may be enumerated by the PAL 110. For example, BUS1/DEV0 322 and BUS2/DEV0 324 may be coupled to the PCIe RP 310 as a result of the enumeration process, and BUS3/DEV0 326 may be coupled to the PCIe RP 314.

Figure 4:
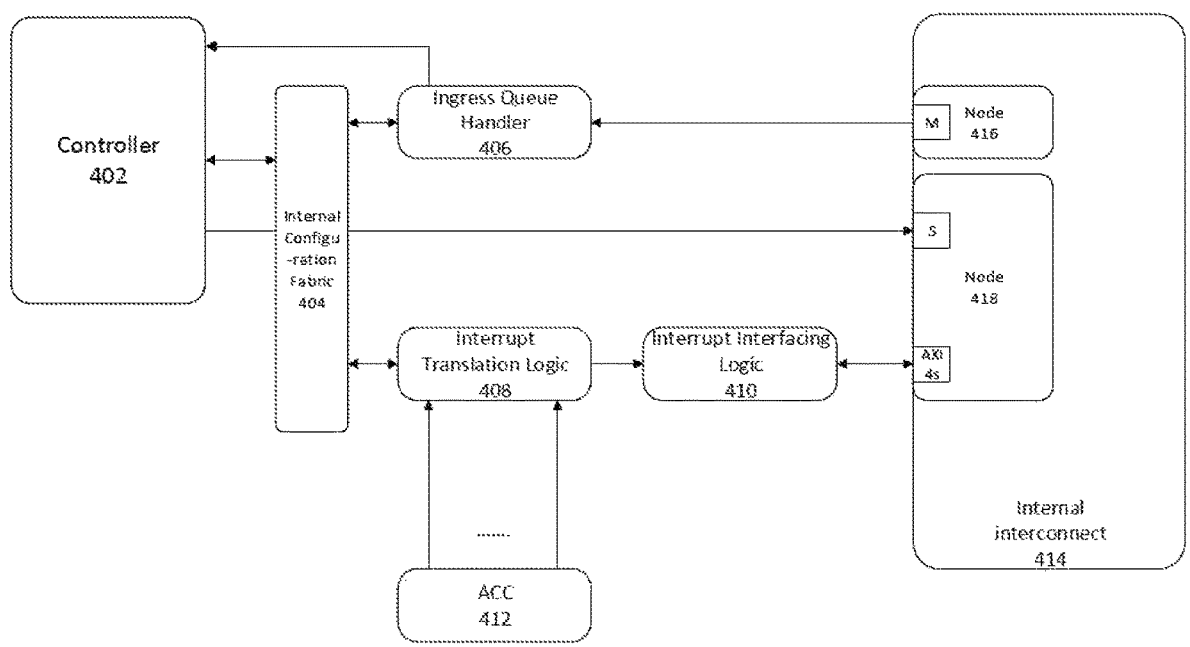
FIG. 4 depicts a block diagram of an example PAL architecture according to aspects of the disclosure.

FIG. 4 depicts a block diagram of an example PCIe abstraction layer architecture according to aspects of the disclosure. Controller 402 may be a microcontroller that may include one or more CPUs and memory and programmable input/output peripherals. Internal configuration fabric 404 may be used by processor 402 to access ingress queue handler 406 and interrupt translation logic 408. Internal configuration fabric 404 may be a protocol optimized for reducing interface complexity and minimal power consumption for supporting peripheral functions.

Ingress queue handler 406 may store the PCIe configuration transactions routed to PAL 110. Once configuration transactions are stored in the ingress queue handler 406, an interrupt may be initiated towards controller 402 to signal that a new configuration transaction may be processed. The ingress queue handler 406 may also implement a response queue used by controller 402 to return the read and write commands toward the mesh 120 in FIG. 1.

Interrupt translation logic 408 may be a table configured by controller 402 used to translate line interrupts arriving from the accelerators serviced by the PAL 110 to {DeviceID, EventID} attributes passed to the local interrupt interfacing logic 410. In one example, the line interrupts arriving from the accelerators may be blocked using an Access control checker (ACC) 412. ACC 412 may provide access control to CSRs of the mesh 120 in FIG. 1 and the controller 402, ingress queue hander 406.

Interrupt interfacing logic 410 may be used to forward accelerator interrupts to a generic interrupt controller. Interrupt interfacing logic 410 may interact with Internal interface 414 through a protocol.

Internal interconnect 414 may be a hardware interconnect that may interconnect Controller 402, ingress queue handler 406, and interrupt interfacing logic 410. Internal interconnect 414 may contain one or more nodes that may interact with a particular component. For example, Node 418 may interact with controller 402, and node 416 may interact with ingress queue handler 406.

Figure 5:
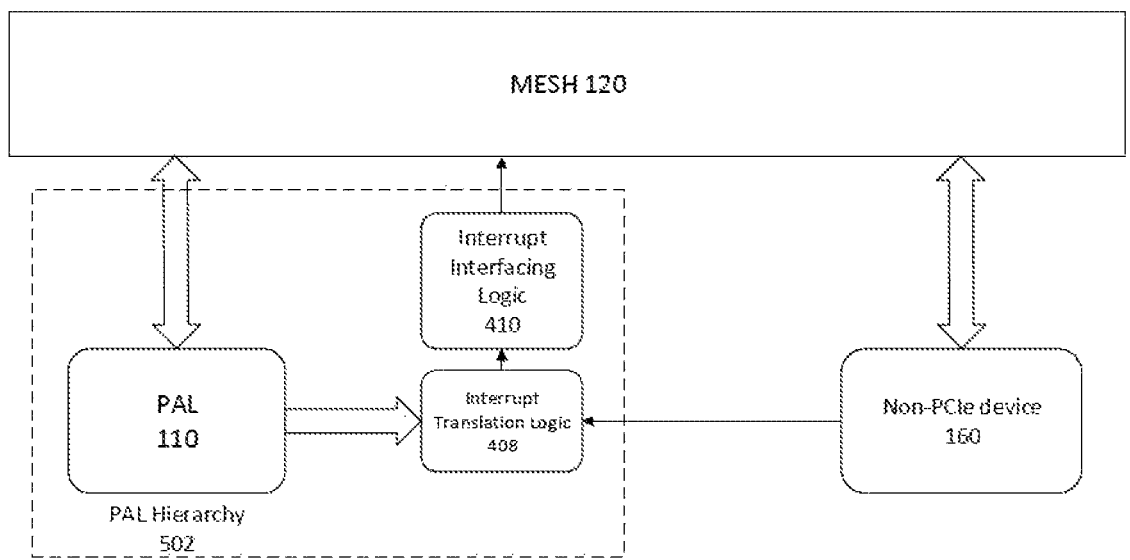
FIG. 5 depicts a block diagram of an example functional interrupt handling process by PAL according to aspects of the disclosure.

FIG. 5 depicts a block diagram of an example functional interrupt handling process by PAL according to aspects of the disclosure. PAL hierarchy 502 includes PAL 110, interrupt translation logic 408, and interrupt interfacing logic 410. As for the non-PCIe devices that may support Message-signaled Interrupts (MSIs) generation, PAL 110 may configure the non-PCIe device 160 MSIs based on the configuration transactions generated by the software running on the core 140. However, when the non-PCIe device 160 only supports line interrupts, a dedicated interrupt translator may be implemented. In this example, PAL 110 may configure interrupt translation logic 408 to configure a dedicated interrupt translator for the line interrupts.

In some other examples, PAL 110 may provide a service to translate the line interrupts to MSIs. To avoid having a microcontroller as part of the interrupt path, PAL 110 may implement a hardware unit to handle the translations of the line interrupts to MSIs. PAL 110 firmware may configure the table generated by interrupt translation logic 408 based on PCIe configuration transactions targeting the virtual endpoints allocated to each accelerator.

Figure 6:
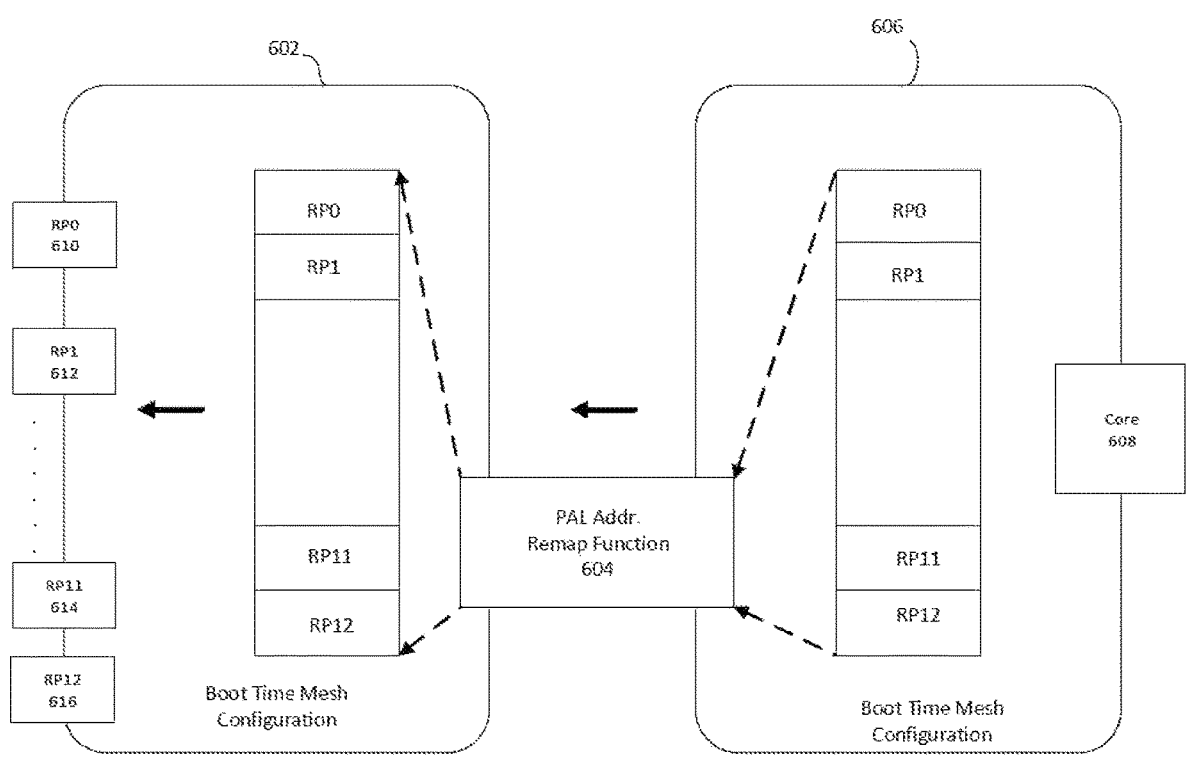
FIG. 6 depicts a block diagram of an example PAL address remap function according to the aspects of the disclosure.

FIG. 6 depicts a block diagram of an example PAL address remap function according to the aspects of the disclosure. For example, when the OS boots, the boot process may configure the mesh with PAL PCIe segment address map 602. The OS may enumerate PCIe devices attached through the mesh and allocate MMIO spaces in the OS PCIe segment address map 606.

When an access point of a PCIe root port creates an MMIO transaction targeting an MMIO space allocated to the PCIe root port in the OS PCIe segment address map 606, the transaction may be routed through the mesh to PAL. PAL Address Remap Function 604 then may translate the address of the targeted MMIO space to the PCIe segment address map 602. The translation may then be routed through the mesh to the root ports, RP0 610 through RP12 616.

Figure 7:
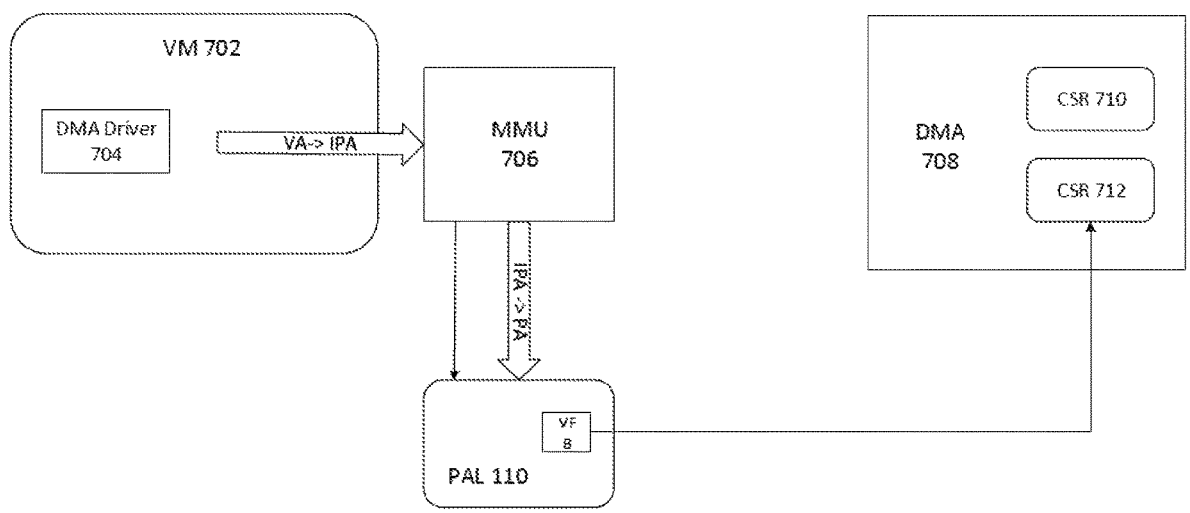
FIG. 7 depicts a block diagrams of example virtual machine mapping processes according to the aspect of the disclosure.

FIG. 7 depicts block diagrams of example virtual machine mapping process utilizing PAL according to the aspect of the disclosure. Referring to FIG. 7, VM 702 includes a DMA driver 704. VM 702 may interact with MMU 706 by translating its virtual address to an internet protocol address and sending it to MMU 706. While only one VM 702 is shown in FIG. 7, it should be understood that multiple VMs may communicate with the DMA 708 through the PAL 110.

MMU 706 may be a memory management unit. The memory management unit may perform the translation of a virtual memory address to a physical address. In this example, MMU 706 may translate the received internet protocol address to the physical address and send it to a non-PCIe device such as a direct memory address DMA 708. DMA 708 may handle the details of a memory transfer to a peripheral device on behalf of the processor.

DMA 708 may include CSR 710 and CSR 712. CSR may be a control and status register that resides in the CPU to store information about instructions received from the PCIe or non-PCIe devices.

PAL 110 may act as a functional virtual machine separator that may abstract or limit access to functions that may not be accessible to a guest OS and to channels not allocated to particular virtual machines.

For example, when software running on VM 702 generates a read or write command to the DMA range in its own virtual address spaces, MMU 706 may translate the address. MMU 706 may translate the address from each VM's DMA range to a separate range which may be configured in the mesh to be routed to PAL 110. Based on the addresses provided with the transaction, PAL 110 may extrapolate an identifier for the VM 702 and perform any abstraction or access control action. PAL 110 may then translate the address provided to the DMA 708 address range and store the address in one of the control and status registers, CSR 712.

Figure 8:
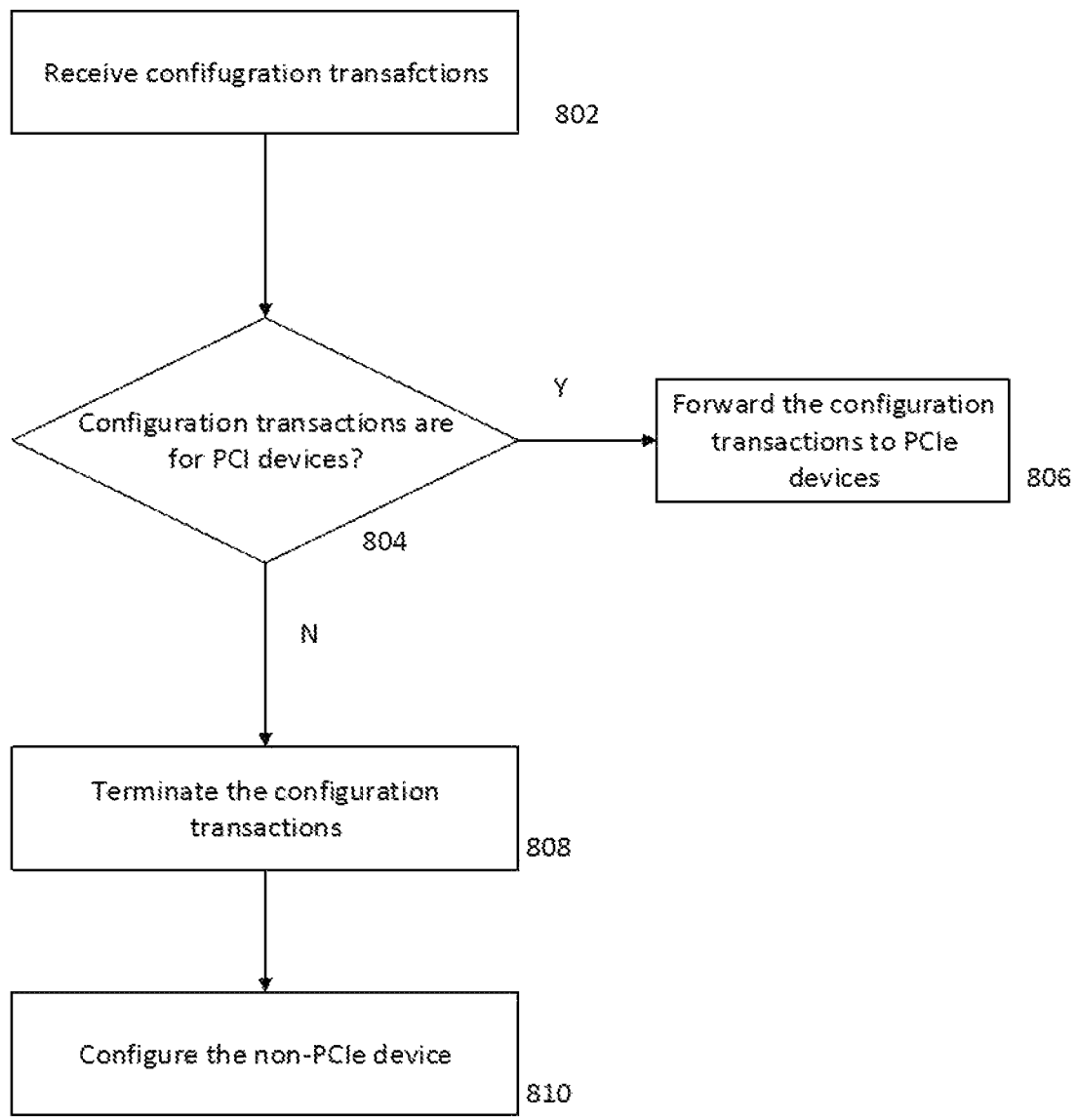
FIG. 8 depicts a flow diagram of an example method for connecting non-PCIe accelerators as PCIe devices according to the aspect of the disclosure.

FIG. 8 depicts a flow diagram of an example method of connecting non-PCIe devices as abstracted PCIe devices using PAL. According to block 802, PAL may receive configuration transactions from a core of a computer system. According to some examples, the configuration transactions may include configuring a peripheral device being attached to the system.

According to block 804, PAL may determine whether the peripheral device attached to the system is a PCIe device or a non-PCIe device. If PAL determines that the peripheral device is a PCIe device, then it may proceed to block 806. If PAL determines that the peripheral device is a non-PCIe device, then it may proceed to block 808.

According to block 806, PAL may forward the configuration transactions received from the core to PCIe devices.

According to block 808, PAL terminates the configuration transactions when the peripheral device is a non-PCIe device.

According to block 810, PAL configures the non-PCIe device as an abstracted PCIe device. According to some examples, PAL may generate a virtual root port with one or more virtual endpoints to communicate transactions with the non-PCIe device. PAL may generate a PCIe topology that may contain all connected PCIe devices and abstracted PCIe devices. PAL may also implement a virtual configuration space within its own memory space, such that PAL may respond to any configuration reads or writes on behalf of the abstracted PCIe devices. Therefore, PAL may provide a fully standardized mechanism through which an operating system and application software may discover and program the abstracted PCIe devices in the same manner as PCIe devices, such that function and device reset, device assignment, and platform error handling flow can be achieved more effectively and efficiently.

Although the technology herein has been described with reference to particular examples, it is to be understood that these examples are merely illustrative of the principles and applications of the present technology. It is therefore to be understood that numerous modifications may be made and that other arrangements may be devised without departing from the spirit and scope of the present technology as defined by the appended claims.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible implementations. Further, the same reference numbers in different drawings can identify the same or similar elements.

The invention claimed is:

1. A method for connecting non-Peripheral Component Interconnect Express ("PCIe") accelerators as PCIe devices, the method comprising:

receiving, at a PCIe abstraction layer (PAL) comprising firmware, a set of configuration transactions from a core of a system in response to a device being connected to the system;

forwarding, by the PAL a first subset of the set of configuration transactions to one or more controllers of a PCIe device, wherein the first subset of the set of configuration transactions are for configuring the PCIe device;

terminating, by the PAL, a second subset of the configuration transactions, wherein the second subset of the set of configuration transactions are for configuring a non-PCIe device; and configuring, by the PAL, the non-PCIe device directly as an abstracted PCIe device.

2. The method of claim 1, wherein configuring the non-PCIe device directly comprises processing device-specific and function-specific configurations directly with the non-PCIe device.

3. The method of claim 1, wherein, upon the configuring, the non-PCIe device accesses memory of the system directly using native interfaces and ordering schemes embedded in the non-PCIe device.

4. The method of claim 1, further comprising creating a PCIe topology within the PAL, wherein the PCIe topology includes a plurality of PCIe devices and a plurality of abstracted PCIe devices.

5. The method of claim 4, wherein the PCIe topology is accessed through an Enhanced Configuration Access Mechanism ("ECAM") to allow management of multiple PCIe configurations by stopping multiple threads from trying to simultaneously access a configuration space.

6. The method of claim 1, further comprising creating a PCIe configuration space when virtualization is not natively supported by the non-PCIe device.

7. The method of claim 6, wherein the PCIe configuration space is created using the firmware of the PAL based on a representation of configuration space enabling single-root I/O virtualization (SR-IOV) to allow for device virtualization.

8. The method of claim 1, further comprising:
assigning the non-PCIe device to a memory-mapped I/O ("MMIO") range; and
configuring a mesh network to map the non-PCIe device to the PAL.

9. The method of claim 1, wherein the non-PCIe device is an accelerator, and further comprising implementing an accelerator specific interface that provides a virtual function separation.

10. The method of claim 1, wherein, when the configuration transactions are for a PCIe device, the configuration transactions to the one or more controllers of the PCIe device are forwarded via a mesh network.

11. The method of claim 1, further comprising observing one or more configuration-write transactions to a memory by maintaining a copy of a PCIe topology.

12. A system for connecting non-Peripheral Component Interconnect Express ("PCIe") accelerators as PCIe devices, the system comprising:
one or more memories; and
one or more processors configured to:
receive, at a PCIe abstraction layer (PAL) comprising firmware, one or more configuration transactions from a core of a system in response to a device being connected to the system;
forward, by the PAL, the configuration transactions to one or more controllers of a PCIe device when the configuration transactions are for configuring the PCIe device;
terminate, by the PAL when the configuration transactions are for configuring a non-PCIe device, the configuration transactions for the non-PCIe device; and
configure, by the PAL, the non-PCIe device directly as an abstracted PCIe device.

13. The system of claim 12, wherein the one or more processors are configured to process device-specific and function-specific configurations directly with the non-PCIe device.

14. The system of claim 12, wherein, upon the configuring, the non-PCIe device accesses memory of the system directly using native interfaces and ordering schemes embedded in the non-PCIe device.

15. The system of claim 12, wherein the one or more processors are configured to create a PCIe topology within the PAL, wherein the PCIe topology includes a plurality of PCIe devices and a plurality of abstracted PCIe devices.

16. The system of claim 15, wherein the PCIe topology is accessed through an Enhanced Configuration Access Mechanism ("ECAM") to allow management of multiple PCIe configurations by stopping multiple threads from trying to simultaneously access a configuration space.

17. The system of claim 12, wherein the one or more processors are configured to create a PCIe configuration space when virtualization is not natively supported by the non-PCIe device.

18. The system of claim 12, wherein the one or more processors are configured to:
assign the non-PCIe device to a memory-mapped I/O ("MMIO") ranges; and
configure a mesh network to map the non-PCIe device to the PAL.

19. The system of claim 12, wherein the configuration transactions are forwarded via a mesh network to the one or more controllers of the PCIe device.

* * * * *